(12) United States Patent
Knezevic et al.

(10) Patent No.: US 9,900,154 B2
(45) Date of Patent: Feb. 20, 2018

(54) OPTIMIZED HARDWARD ARCHITECTURE AND METHOD FOR ECC POINT ADDITION USING MIXED AFFINE-JACOBIAN COORDINATES OVER SHORT WEIERSTRASS CURVES

(71) Applicant: NXP B.V., Eindhoven (NL)

(72) Inventors: Miroslav Knezevic, Leuven (BE); Ventzislav Nikov, Heverlee (BE)

(73) Assignee: NXP B.V., Eindhoven (NL)

( * ) Notice: Subject to any disclaimer, the term of this patent is extended or adjusted under 35 U.S.C. 154(b) by 116 days.

(21) Appl. No.: 14/139,831

(22) Filed: Dec. 23, 2013

(65) Prior Publication Data
US 2015/0180664 A1 Jun. 25, 2015

(51) Int. Cl.
*H04L 9/30* (2006.01)
*G06F 7/72* (2006.01)

(52) U.S. Cl.
CPC ............ *H04L 9/3066* (2013.01); *G06F 7/725* (2013.01)

(58) Field of Classification Search
CPC ..... H04L 9/3013; H04L 9/003; H04L 9/3066; G06F 7/725; G06F 2207/7228
USPC .......................................................... 380/30
See application file for complete search history.

(56) References Cited

U.S. PATENT DOCUMENTS

| | | | |
|---|---|---|---|
| 6,112,218 A | 8/2000 | Gandhi et al. | |
| 6,366,940 B1 | 4/2002 | Ono et al. | |
| 6,567,832 B1* | 5/2003 | Ono et al. | 708/606 |
| 6,738,478 B1* | 5/2004 | Vanstone | G06F 7/725 380/28 |
| 7,508,936 B2 | 3/2009 | Eberle et al. | |
| 7,702,105 B1 | 4/2010 | Gura | |
| 8,112,626 B1* | 2/2012 | Adler et al. | 713/168 |
| 8,582,758 B2* | 11/2013 | Joye | 380/28 |
| 2001/0033655 A1* | 10/2001 | Vadekar | G06F 7/725 380/28 |
| 2003/0068037 A1 | 4/2003 | Bertoni et al. | |
| 2004/0158597 A1* | 8/2004 | Ye | G06F 7/725 708/492 |
| 2007/0198824 A1* | 8/2007 | Chen | G06F 7/725 713/150 |
| 2009/0300087 A1 | 12/2009 | Tajiri | |
| 2009/0319804 A1* | 12/2009 | Qi | G06F 9/30145 713/190 |
| 2010/0011047 A1 | 1/2010 | Jackson et al. | |

(Continued)

FOREIGN PATENT DOCUMENTS

CN 101782845 A 7/2010
CN 102109974 A 6/2011
(Continued)

OTHER PUBLICATIONS

EP Communication—European Search Report in EP 14198456.7 dated Apr. 7, 2015.
(Continued)

*Primary Examiner* — Hadi Armouche
*Assistant Examiner* — Bryan Wright (57) ABSTRACT

An optimized hardware architecture and method introducing a simple arithmetic processor that allows efficient implementation of an Elliptic Curve Cryptography point addition algorithm for mixed Affine-Jacobian coordinates. The optimized architecture additionally reduces the required storage for intermediate values.

8 Claims, 6 Drawing Sheets

(56) References Cited

U.S. PATENT DOCUMENTS

| | | | |
|---|---|---|---|
| 2010/0040225 A1* | 2/2010 | Venelli et al. | 380/28 |
| 2010/0150340 A1 | 6/2010 | Choi et al. | |
| 2011/0075836 A1 | 3/2011 | Yamamoto et al. | |
| 2014/0016772 A1 | 1/2014 | Yajima et al. | |

FOREIGN PATENT DOCUMENTS

| | | |
|---|---|---|
| CN | 102297725 A | 12/2011 |
| CN | 102393812 A | 3/2012 |
| JP | 2007-286380 A | 11/2007 |
| JP | 4621162 B2 | 1/2011 |

OTHER PUBLICATIONS

Anonymous, EFD/Genus-1 large-characteristic/Jacobian coordinates with a4=−3 for short Weierstrass curves, 3, retrieved from the Internet, Dec. 1, 2013.

Baktir, et al., A state-of-the-art Elliptic Curve Cryptographic Processor Operating in the Frequency Domain, Mobile Networks an Applcations (Monet) Journal, vol. 12, No. 4, Sep. 30, 2007, Kluwer Academic Publishers, Boston.

Bernstein, A Software Implementation of NIST P-224, retrieved from the Internet: Oct. 29, 2001 URL:http:/cr.yp.to/talks/2001.10.29/slides.ps/2001.10/29/slide—retrieved Mar. 25, 2015.

Izu, et al., Fast Elliptic Curve Multiplications with SIMD Operations, IEICE Transactions on Fundamentals of Electronics, Communications and Computer Sciences, Engineering Sciencies Society, vol. E87-A, No. 1, pp. 85-93, Jan. 1, 2004.

Szerwinski, R. "Efficient Cryptography on Graphics Hardware", 133 pgs, Diploma Thesis, Dept. of Electrical Engineering & Information Sciences, Ruhr-Univ. Bochum, retrieved from the internet at: https://www.emsec.rub.de/media/crypto/attachments/files/2010/04/da_szerwinski.pdf (Feb. 15, 2008).

Communication pursuant to Article 94(3) EPC for the related patent application 14198913.7 (Apr. 3, 2017).

Cohen, H. et al. "Efficient Elliptic Curve Exponentiation Using Mixed Coordinates", International Conference on the Theory and Application of Cryptology and Information Security: Advances in Cryptology, vol. pp. 51-65 (Oct. 18, 1998).

Johnson, D. et al. "The Elliptic Curve Digital Signature Algorithm (ECDSA)", Certicom Corporation, 56 pgs, retrieved from the internet at: http://cs.ucsb.edu/~koc/ccs130h/notes/ecdsa-cert.pdf (2001).

Bednara, M. et al. "Tradeoff Analysis of FPGA Based Elliptic Curve Cryptography", IEEE International Symposium on Circuits and Systems, pp. 797-800 (Aug. 7, 2002).

Lochter, M. et al. "Elliptic Curve Cryptograhy (ECC) Brainpool Standard Curves and Curve Generation", 28 pgs, retrieved from the internet at: https://tools.ietf.org/html/rfc5639 (Mar. 2010).

Miller, V. S "Use of Elliptic Curves in Cryptography", Conference on the Theory and Application of Cryptographic Techniques, pp. 417-426 (1985).

Koblitz, N. et al. "Elliptic Curve Cryptosystems", Mathematics of Computation, vol. 48, No. 177, pp. 203-209 (Jan. 1987).

"FIPS PUB 186-3—Federal Information Processing Standards Publication—Digital Signature Standard (DSS)", National Institute of Standards and Technology, 131 pgs, retrieved from the internet at: http://csrc.nist.gov/publications/fips/fips186-3/fips_186-3.pdf (Jun. 2009).

"SEC 2: Recommended Elliptic Curve Domain Parameters—Version 1.0", Standards for Efficient Cryptography, Certicom Corporation, 51 pgs, retrieved from the internet at: http://www.secg.org/SEC2-Ver-1.0.pdf (Sep. 20, 2000).

Hankerson, D. et al. "Guide to Elliptic Curve Cryptography", Springer, 332 pgs (2004).

Hankerson, D. et al. "Elliptic Curve Arithmetic—Guide to Elliptic Curve Cryptography", Springer, pp. 75-113 (Jan. 1, 2004).

Batina, L. et al. "Hardware architectures for public key cryptography", Integration, the VLSI journal 34, pp. 1-64 (2003).

Guneysu, T. et al. "Ultra High Performance ECC over NIST Primes on Commercial FPGAs", International Workshop on Cryptographic Hardward and Embedded Systems, pp. 62-78 (2008).

Vinay, T. et al. "FPGA Impementation of Elliptical Curve Cryptography Using Mixed Coordinates", International Journal of VLSI and Embedded Systems—IJVES, vol. 4, Article 06104, pp. 438-443 (Jun. 2013).

Extended European Search Report for Patent Appln. No. 14198280.1 (dated Jul. 28, 2015).

Extended European Search Report for Patent Appln. No. 14198913.7 (dated Jun. 25, 2015).

Office Action from related CN Appln. No. 201410799942.0 (dated Jul. 3, 2017).

Office Action from counterpart CN Appln. No. 201410806141.2 (dated Mar. 1, 2017).

* cited by examiner

FIG. 1
PRIOR ART

INPUT: $P = (X_1 : Y_1 : Z_1)$ IN JACOBIAN COORDINATES, $Q = (x_2, y_2)$ IN AFFINE COORDINATES ON E/K: $y = x^2 - 3x + b$ CURVE.
OUTPUT: $P + Q = (X_3 : Y_3 : Z_3)$ IN JACOBIAN COORDINATES.
1: if $Q = \infty$ then return $(X_1 : Y_1 : Z_1)$.
2: if $P = \infty$ then return $(x_2 : y_2 : 1)$.
3: $T_1 = Z_2$
4: $T_1 = T_1 * Z_1$.
5: $T_1 = T_1 * x_2$.
6: $T_2 = T_2 * y_2$.
7: $T_1 = T_1 - X_1$.
8: $T_2 = T_2 - Y1$.
9: if $T_1 = 0$ and $T_2 = 0$ then return $2(x_2 : y_2 : 1)$.
10: if $T_1 = 0$ and $T_2 \neq 0$ then return $\infty$.
11: $Z_3 = Z_1 * T_1$.
12: $T_3 = T_1^2$.
13: $T_4 = T_3 * T_1$.
14: $T_3 = T_3 * X_1$.
15: $T_1 = 2T_3$.
16: $X_3 = T_2^2$.
17: $X_3 = X_3 - T_1$.
18: $X_3 = X_3 - T_4$.
19: $T_3 = T_3 - X_3$.
20: $T_3 = T_3 * T_2$.
21: $T_4 = T_4 * Y_1$.
22: $Y_3 = T_3 * T_4$.
23: return $(X_3 : Y_3 : Z_3)$.

OPTIMIZED HARDWARE ARCHITECTURE AND METHOD FOR ECC POINT ADDITION USING MIXED AFFINE-JACOBIAN COORDINATES OVER SHORT WEIERSTRASS CURVES

BACKGROUND

Electronic devices are becoming a ubiquitous part of everyday life. The number of smartphones and personal tablet computers in use is rapidly growing. A side effect of the increasing use of smartphones and personal tablets is that increasingly the device are used for storing confidential data such as personal and banking data. Protection of this data against theft is of paramount importance.

The field of cryptography offers protection tools for keeping this confidential data safe. Based on hard to solve mathematical problems, cryptography typically requires highly computationally intensive calculations that are the main barrier to wider application in cloud and ubiquitous computing (ubicomp). If cryptographic operations cannot be performed quickly enough, cryptography tools are typically not accepted for use on the Internet. In order to be transparent while still providing security and data integrity, cryptographic tools need to follow trends driven by the need for high speed and the low power consumption needed in mobile applications.

Public key algorithms are typically the most computationally intensive calculations in cryptography. For example, take the case of Elliptic Curve Cryptography (ECC), one of the most computationally efficient public key algorithms. The 256 bit version of ECC provides security that is equivalent to a 128 bit symmetric key. A 256 bit ECC public key should provide comparable security to a 3072 bit RSA public key. The fundamental operation of ECC is a point multiplication which is an operation heavily based on modular multiplication, i.e. approximately 3500 modular multiplications of 256 bit integers are needed for performing one ECC 256 point multiplication. Higher security levels (larger bit integers) require even more computational effort.

Figure 1:
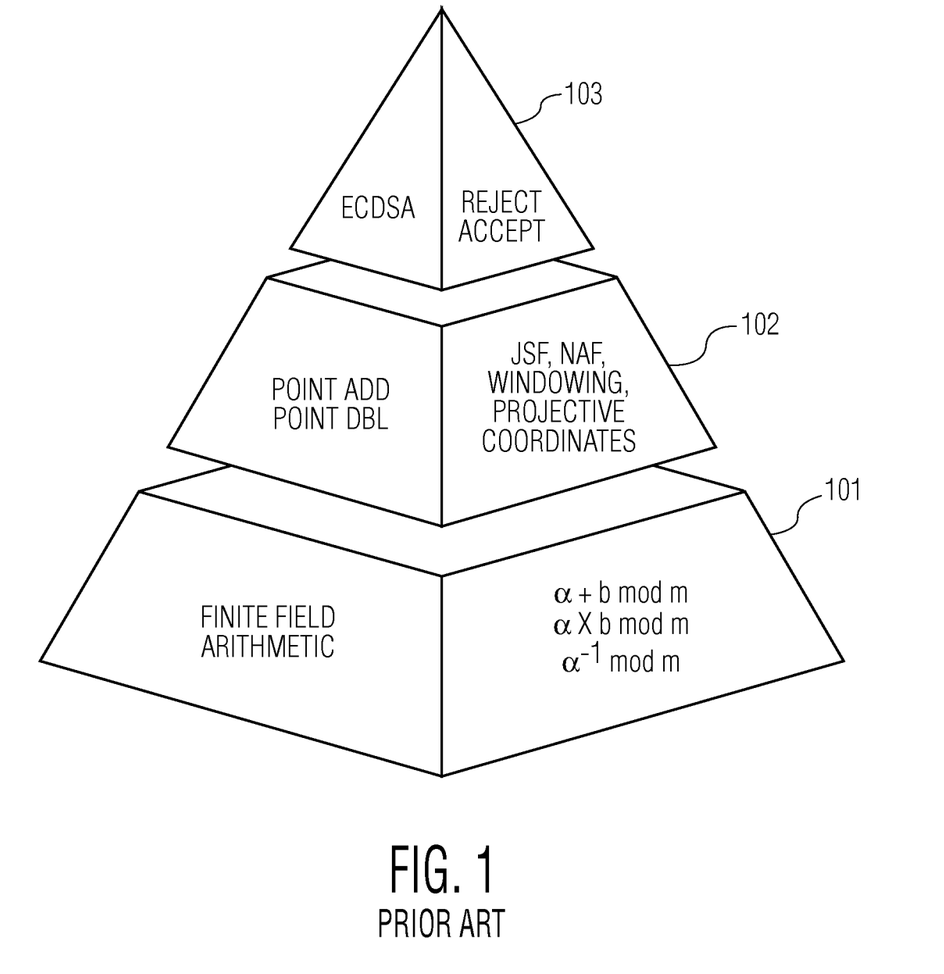
FIG. 1 shows stages 101, 102 and 103 that are needed to realize the Elliptical Curve Digital Signature Algorithm (ECDSA).

Building an efficient implementation of ECC is typically non-trivial and involves multiple stages. FIG. 1 illustrates stages 101, 102 and 103 that are needed to realize the Elliptical Curve Digital Signature Algorithm (ECDSA), which is one of the applications of ECC. Stage 101 deals with finite field arithmetic that comprises modular addition, inversion and multiplication. Stage 102 deals with point addition and point doubling which comprises the Joint Sparse Form (JSF), Non-Adjacent Form (NAF), windowing and projective coordinates. Finally, stage 103 deals with the ECDSA and the acceptance or rejection of the digital signature.

Any elliptic curve can be written as a plane geometric curve defined by the equation of the form (assuming the characteristic of the coefficient field is not equal to 2 or 3):

$$y^2 = x^3 + ax + b \quad (1)$$

that is non-singular; that is it has no cusps or self-intersections and is known as the short Weierstrass form where a and b are integers. The case where a=−3 is typically used in several standards such as those published by NIST, SEC and ANSI which makes this the case of typical interest.

Many algorithms have been proposed in the literature for efficient implementation of the Point Addition (PADD) and Point Doubling (PDBL) operations. Many of these algorithms are optimized for software implementation. While these are typically efficient on certain platforms, the algorithms are typically not optimal once the underlying hardware can be tailored to the algorithm.

Figure 2:
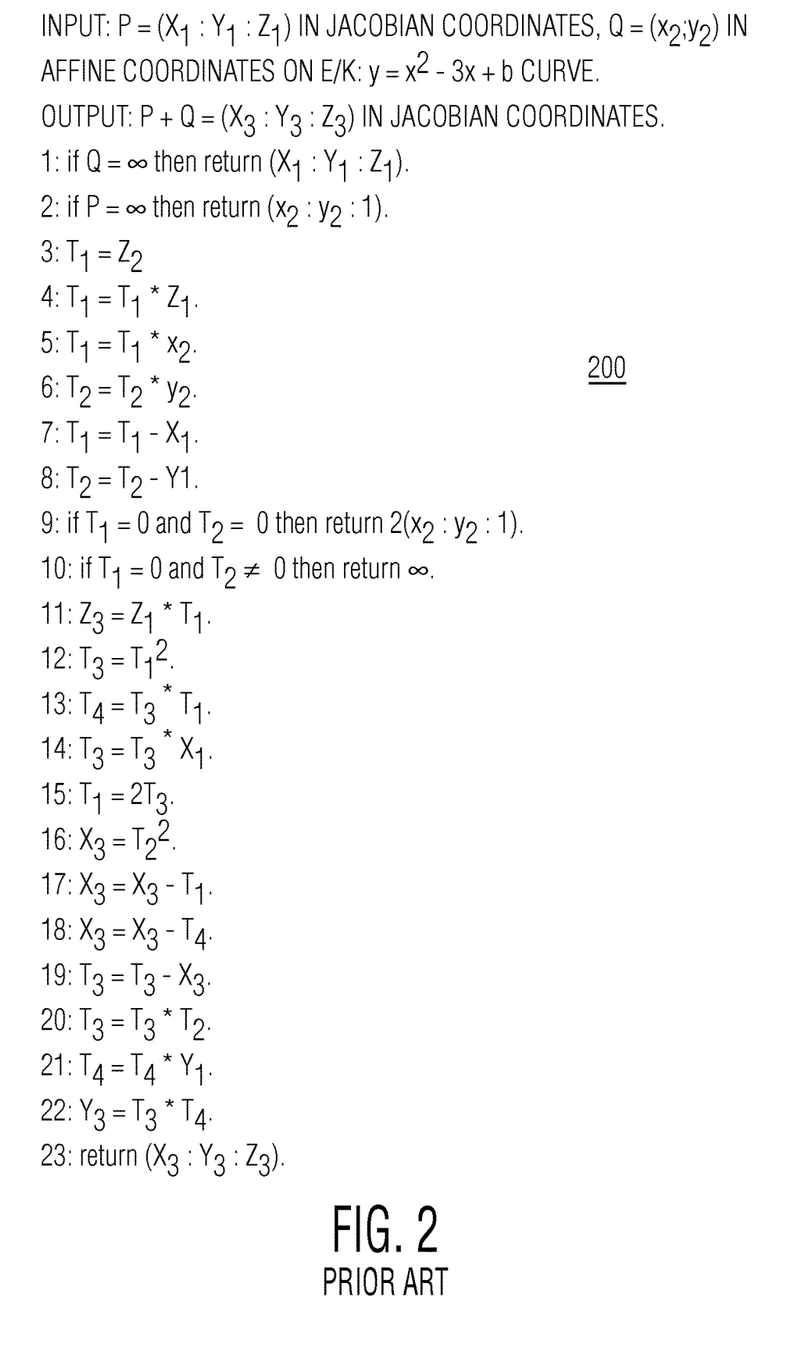
FIG. 2 shows a prior art point addition algorithm.

A PADD algorithm for mixed affine-Jacobian coordinates has been described by Cohen, Miyaji and Ono in Proceedings of the International Conference on the Theory and Applications of Cryptography and Information Security; Advances in Cryptology, ASIACRYPT 1998, pages 51-65, Springer-Verlag, 1998. Jacobian coordinates are projective coordinates where each point is represented as three coordinates (X, Y, Z) where $x=X/Z^2$, $y=Y/Z^3$ and affine coordinates are the familiar (x,y) coordinates. Note the coordinates are all integers. PADD algorithm 200 requires 8 modular multiplications, 3 modular squarings, 6 modular subtractions, and one modular multiplication by 2 and is shown in FIG. 2. In order to perform the PADD, the algorithm further requires a minimum of 4 temporary registers, which for ECC 256 bit each need to be 256 bits in size. All operations are done in the finite field K over which the elliptic curve E is defined. The finite arithmetic field K is defined over the prime number p so that all arithmetic operations are performed modulo p. The additive identity element is the point at infinity.

SUMMARY

An optimized hardware architecture and method reduces storage requirements and speeds up the execution of the ECC PADD algorithm by requiring only two temporary storage registers and by introducing a simple arithmetic unit for performing modular subtraction and modular multiplication by 2.

DETAILED DESCRIPTION

Figure 3:
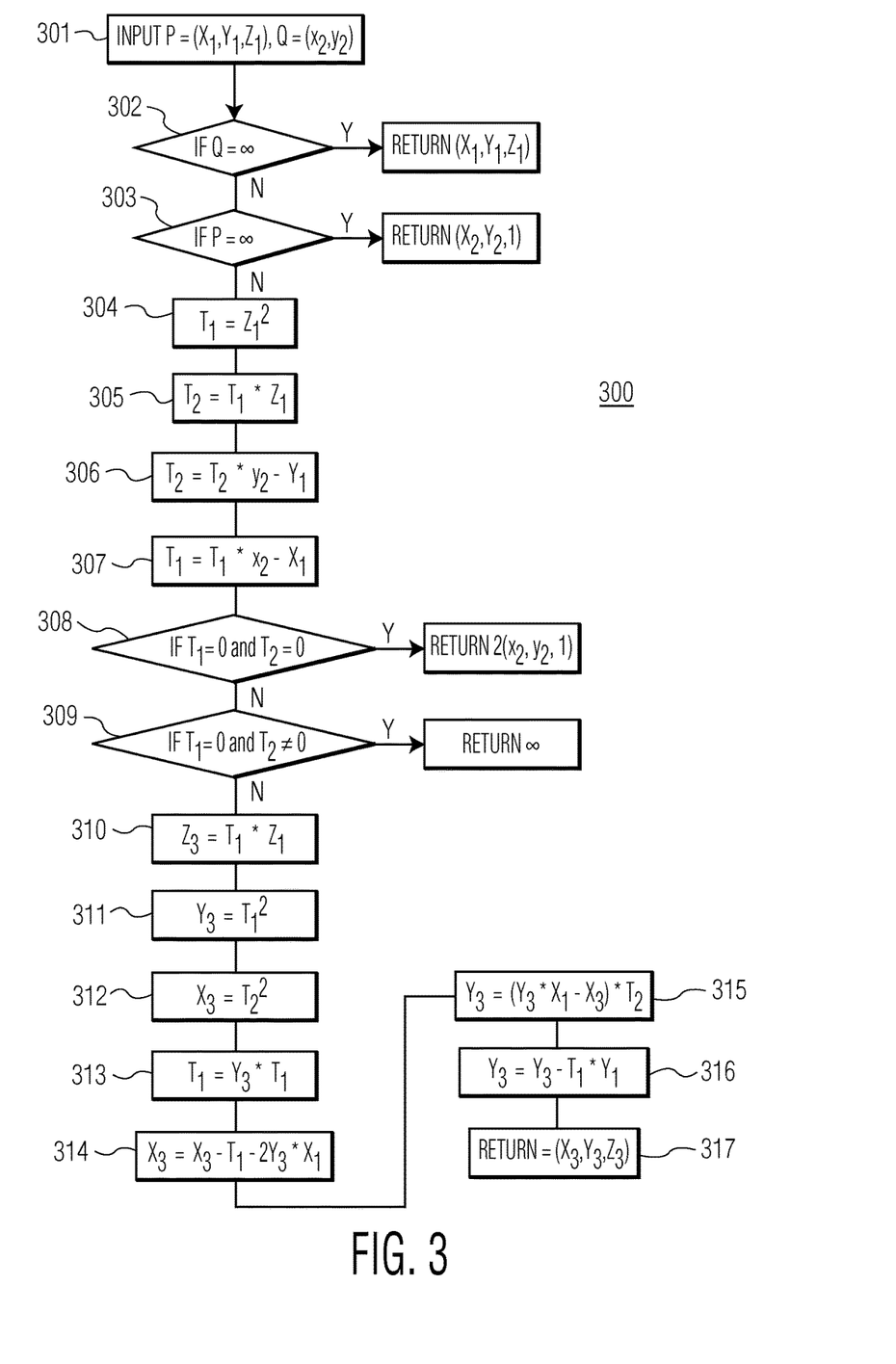
FIG. 3 shows an embodiment in accordance with the invention.

PADD algorithm 300 in accordance with the invention is shown in FIG. 3. PADD algorithm 300 requires fewer steps and reduces the storage requirements compared to PADD algorithm 200 for the same modular addition of two points. PADD algorithm 300 requires only two temporary storage registers, $T_1$ and $T_2$. Note, PADD algorithm 300 performs modular point addition using mixed affine-Jacobian coordinates to avoid the need for a modular inversion operation that is typically one to two orders of magnitude slower than a modular multiplication operation. The use of mixed coordinates provides a speed advantage over performing the point addition solely in Jacobian coordinates that also obviates the need for a modular inversion operation. PADD algorithm 300 is implemented over an optimized hardware architecture shown in FIG. 6 and FIG. 7 and specifically designed to take advantage of PADD algorithm 300.

As input in step 301, PADD algorithm 300 shown in FIG. 3 takes point $P=(X_1, Y_1, Z_1)$ in Jacobian coordinates and point $Q=(x_2, y_2)$ in affine coordinates as the two points to be added together as P+Q. $T_1$ and $T_2$ are temporary storage variables. Note that all mathematical operations shown are in modular arithmetic. In step 302 of PADD algorithm 300, the value of point P is returned as the result of the modular addition of P+Q if $Q=\infty$, as a point at infinity is the identity element. Similarly, in step 303, the value of point Q is returned as the result of the modular addition of P+Q if $P=\infty$, as a point at infinity is the additive identity element. In step 304, the Jacobian coordinate $Z_1$ is squared and the resulting value stored in temporary register $T_1$. In step 305, $Z_1*T_1$ is calculated and the resulting value stored in temporary register $T_2$. In step 306, $T_2*y_2-Y_1$ is calculated, where $y_2$ is in affine coordinates and $Y_1$ is in Jacobian coordinates, the result being stored in temporary register $T_2$. In step 307, the value stored in temporary register $T_1$ is multiplied by $x_2$ and $X_1$ is then subtracted from the result, where $x_2$ is in affine coordinates and $X_1$ is in Jacobian coordinates, the result being stored in temporary register $T_1$. Step 308 provides for a return if $T_1$ and $T_2$ are both zero as this means P=Q and step 309 provides for a return if $T_1$ is zero and $T_2$ is not zero as this means P=-Q. In step 310, the Jacobian coordinate $Z_1$ is multiplied by the value in temporary register $T_1$ and the result is stored as Jacobian coordinate $Z_3$. In step 311, the value stored in temporary register $T_1$ is squared and stored as Jacobian coordinate $Y_3$. In step 312, the value stored in temporary register $T_2$ is squared and stored as Jacobian coordinate $X_3$. In step 313, $Y_3*T_1$ is calculated and the result is stored in temporary register $T_1$. In step 314, $T_1+2Y_3*X_1$ is calculated and subtracted from Jacobian coordinate $X_3$ with the result stored as Jacobian coordinate $X_3$. In step 315, $Y_3*X_1-X_3$ is calculated and multiplied by $T_2$ and stored as Jacobian coordinate $Y_3$. Note that $Y_3*X_1$ was calculated in step 314 and that value is used in step 315 and is not calculated again in step 315. In step 316, $T_1*Y_1$ is calculated and subtracted from Jacobian coordinate $Y_3$ and the result is stored as Jacobian coordinate $Y_3$. Finally, in step 317 the result of the point addition of P+Q: $(X_3, Y_3, Z_3)$ is returned in Jacobian coordinates.

The most computationally intensive operation in PADD algorithm 300 in FIG. 3 is modular multiplication denoted by "*". Because most of the steps described in PADD algorithm 300 depend on the previous steps of the algorithm, it is typically most efficient to implement PADD algorithm 300 in hardware using a single modular multiplier although more than one modular multiplier may be used in accordance with the invention. Using only one modular multiplier restricts each step in PADD algorithm 300 to having no more than one modular multiplication. While step 315 appears to contain two modular multiplications, the result of $Y_3*X_1$ has already been calculated in step 314 and is fed in directly into the input of the hardware modular multiplier.

Figure 4:
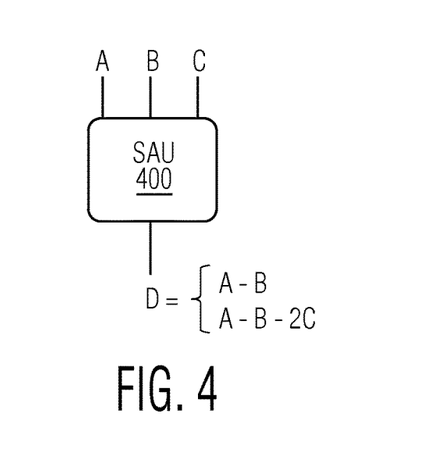
FIG. 4 show an embodiment in accordance with the invention.

It is important to note that besides the modular multiplication steps performed in steps 306, 307, 314, 315 and 316 of PADD algorithm 300, two additional, comparatively simple operations are performed as well: modular subtraction and modular multiplication by 2. Note that multiplication or division by a power of 2 in binary is merely a shift operation. In order to speed up execution of PADD algorithm 300 and eliminate the need for additional temporary registers, an embodiment in accordance with the invention of simple arithmetic unit (SAU) 400 with the inputs and outputs as shown in FIG. 4.

Figure 5:
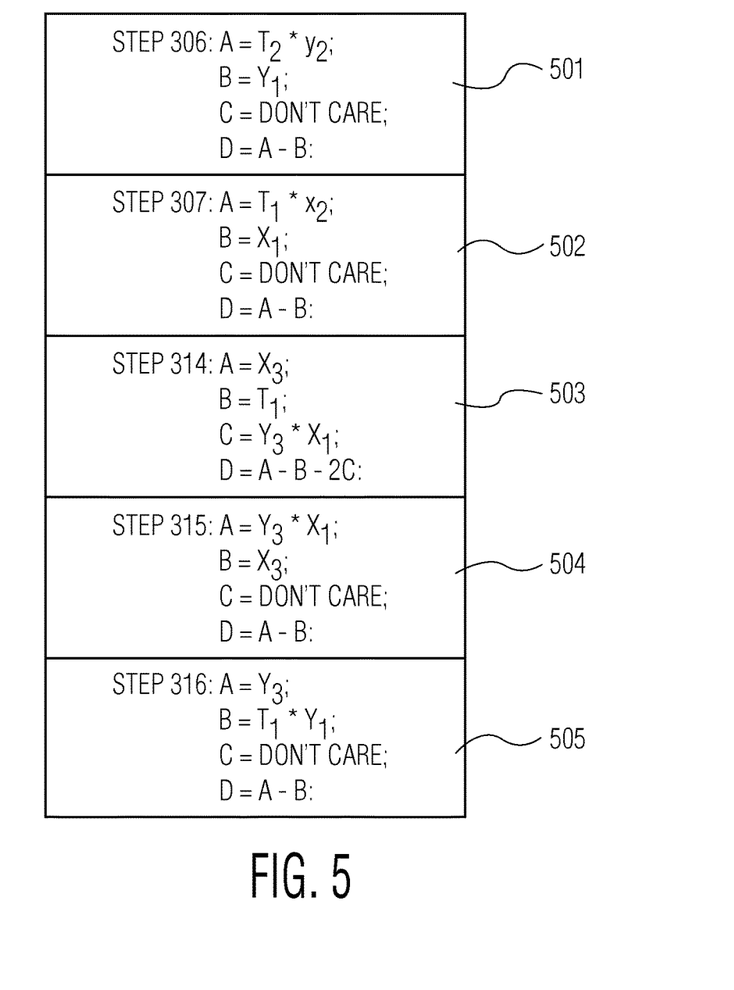
FIG. 5 shows an embodiment in accordance with the invention.

FIG. 5 shows how steps 306, 307, 314, 315 and 316 of PADD 300 in FIG. 3 are broken down for utilization of SAU 400 which has inputs A, B and C with output D. Note that the input and output labels of SAU 400 correspond to the respective variable names in FIG. 5. Block 501 shows how step 306 of PADD algorithm 300 is broken down using SAU 400 and involves setting inputs $A=T_2*y_2$ and $B=Y_1$ with output D=A-B. Output D is written to temporary register $T_2$. Block 501 shows how step 307 of PADD algorithm 300 is broken down using SAU 400 and involves setting inputs $A=T_1*x_2$ and $B=X_1$ with output D=A-B. Output D is then written to temporary register $T_1$. Block 503 shows how step 314 of PADD algorithm 300 is broken down using SAU 400 and involves setting inputs $A=X_3$, $B=T_1$, $C=y_2*X_1$ with output D=A-B-2C. Output D is written to Jacobian coordinate $X_3$. Block 504 shows how step 315 of PADD algorithm 300 is broken down using SAU 400 and involves setting inputs $A=Y_3*X_1$ and $B=X_3$ with output D=A-B. Output D is written to Jacobian coordinate $Y_3$. Block 505 shows how step 316 of PADD algorithm 300 is broken down using SAU 400 and involves setting inputs $A=Y_3$ and $B=T_1*Y_1$ with output D=A-B. Output D is written to Jacobian coordinate $Y_3$. Note that "don't care" indicates the value is irrelevant to the calculation being performed in the respective steps.

Figure 6:
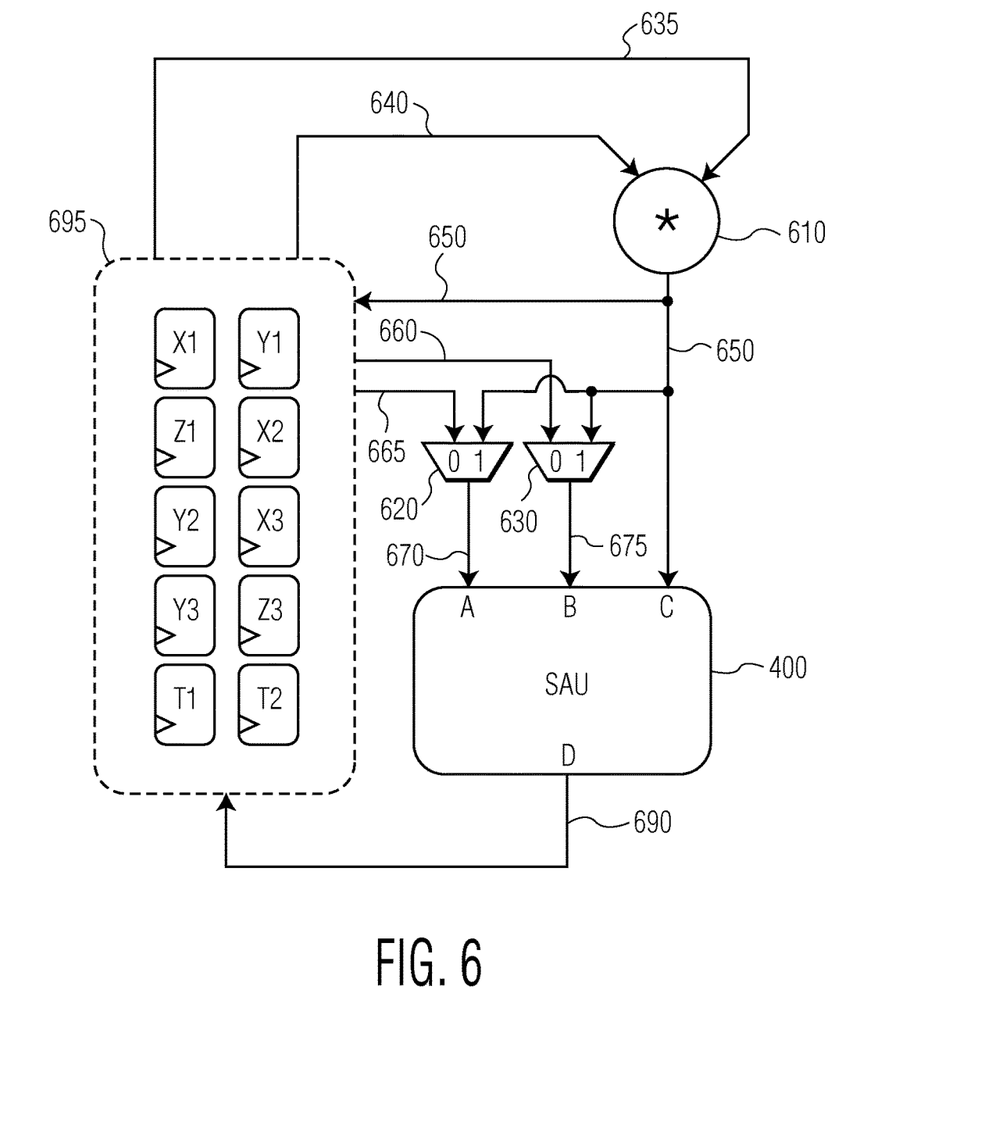
FIG. 6 shows an embodiment in accordance with the invention.

FIG. 6 shows embodiment 600 in accordance with the invention comprising multi-cycle multiplier 610 with output register (not shown), SAU 400, multiplexer (MUX) 620 and MUX 630 with input registers $X_1$, $Y_1$, $Z_1$, $x_2$, $y_2$, output registers $X_3$, $Y_3$, $Z_3$ and temporary registers $T_1$ and $T_2$ that are all part of register memory 695. Note the individual register labels correspond to variable names in FIGS. 3 and 5. MUX 620, 630 and 740 (part of SAU 400, see FIG. 7) are controlled by the microprocessor (not shown) which executes PADD algorithm 300. As noted above, each step in PADD algorithm 300 involve at most one modular multiplication (not counting multiplication or division by 2 which in binary representation is merely a shift operation).

Figure 7:
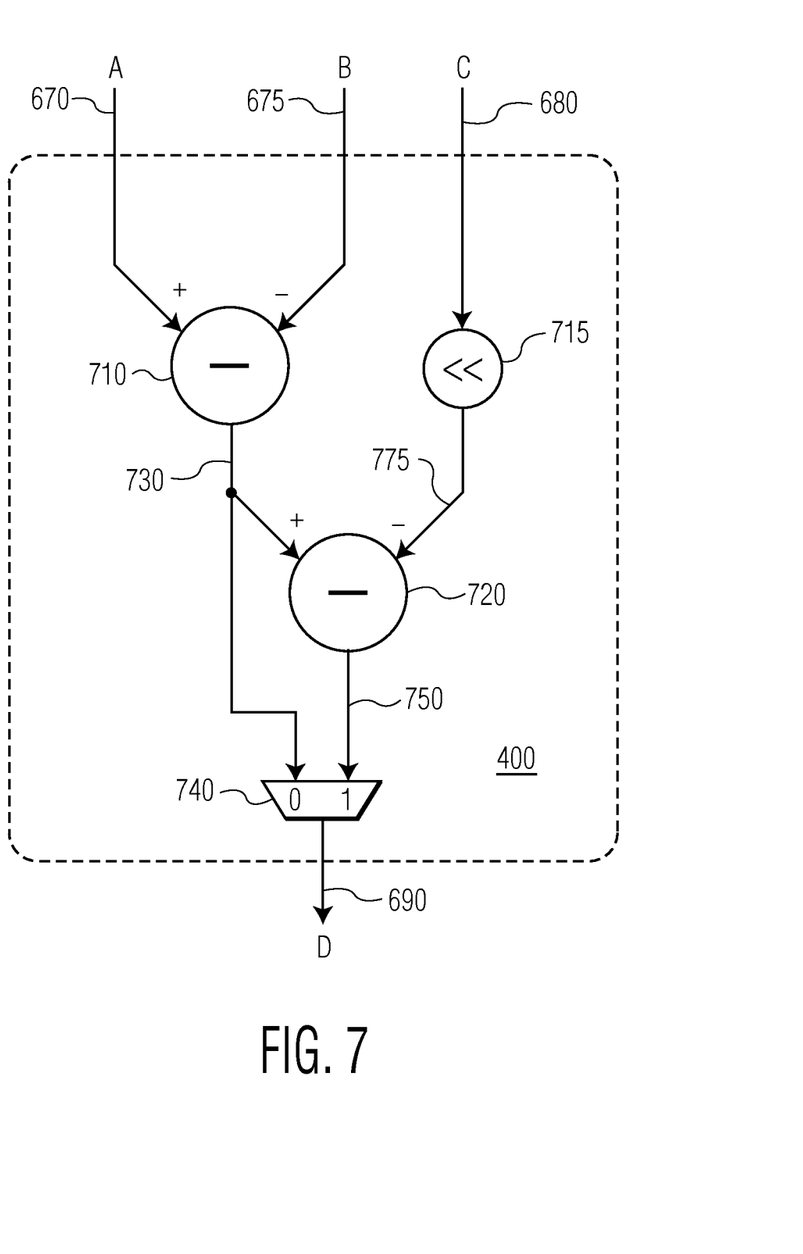
FIG. 7 shows an embodiment in accordance with the invention.

SAU 400 shown in FIG. 7 comprises subtractors 710 and 720, logical one bit left shifter 715 and MUX 720. Input A connects to the minuend input of subtractor 710 on line 670 and input B connects to the subtrahend input of subtractor 710 on line 675. Input C connects to logical one bit left shifter 715 on line 650 where logical one bit left shifter 715 performs a multiplication of the input C by two. Subtractor 710 outputs A-B on line 730 which connects to the minuend input of subtractor 720 and the "0" input for MUX 740. Logical one bit left shifter 715 outputs 2C on line 735 to the subtrahend input of subtractor 720. Subtractor 720 outputs A-B-2C on line 750 to the "1" input for MUX 740. MUX 740 sends D on line 690.

Multi-cycle multiplier 610 functions by multiplying the values on inputs 635 and 640 together and outputting the result. Steps 301-303 are performed in the microprocessor (not shown) without using multi-cycle multiplier 610 and SAU 400.

Step 304 utilizes multi-cycle multiplier 610. Register memory 695 provides $Z_1$ on both inputs 635 and 640 of multi-cycle multiplier 610 and multi-cycle multiplier 610 computes $Z_1^2$ which is sent on line 650 to register memory 695 and stored in temporary register $T_1$.

Step 305 utilizes multi-cycle multiplier 610. Register memory 695 provides $T_1$ on input 635 and $Z_1$ on input 640 of multi-cycle multiplier 610. Multi-cycle multiplier 610 computes $T_1*Z_1$ which is sent on line 650 to register memory 695 where it is stored in temporary register $T_2$.

Step 306 utilizes both multi-cycle multiplier 610 and SAU 400. Register memory 695 provides $T_2$ and $y_2$ on lines 635 and 640, respectively, to multi-cycle multiplier 610. Multi-cycle multiplier 610 computes $T_2*y_2$ which is output on line 650 to input "1" of MUX 620 with MUX 620 set to "1". MUX 630 input is set to "0". MUX 620 sends $T_2*y_2$ to input A of SAU 400 on line 670. Line 670 is directly connected to the minuend input of subtractor 710. Register memory 695 provides $Y_1$ on line 660 to input "0" of MUX 630 and MUX 630 is set to "0". MUX 630 sends $Y_1$ to input B of SAU 400 on line 675. Line 675 is directly connected to the subtrahend input of subtractor 710. Subtractor 710 computes A−B (which is $T_2*y_2-Y_1$) and outputs A−B on line 730 to input "0" of MUX 740 with MUX 740 set to "0". MUX 740 sends D (which is A−B) on line 690 to register memory 695 where it is stored in temporary register $T_2$.

Step 307 utilizes both multi-cycle multiplier 610 and SAU 400. Register memory 695 provides $T_1$ and $x_2$ on lines 635 and 640, respectively, to multi-cycle multiplier 610. Multi-cycle multiplier 610 computes $T_1*x_2$ which is output on line 650 to input "1" of MUX 620 with MUX 620 set to "1". MUX 620 sends $T_1*x_2$ to input A of SAU 400 on line 670. Line 670 is directly connected to the minuend input of subtractor 710. Register memory 695 provides $X_1$ on line 660 to input "0" of MUX 630 and MUX 630 is set to "0". MUX 630 sends $X_1$ to input B of SAU 400 on line 675. Line 675 is directly connected to the subtrahend input of subtractor 710. Subtractor 710 computes A−B (which is $T_1*x_2-X_1$) and outputs A−B on line 730 to input "0" of MUX 740 with MUX 740 set to "0". MUX 740 sends D (which is A−B) on line 690 to register memory 695 where it is stored in temporary register $T_1$.

Steps 308-309 are performed in the microprocessor (not shown) without using multi-cycle multiplier 610 and SAU 400.

Step 310 utilizes multi-cycle multiplier 610. Register memory 695 provides $T_1$ on line 635 and $Z_1$ on line 640 to multi-cycle multiplier 610. Multi-cycle multiplier 610 computes $T_1*Z_1$ and the result is output on line 650 to register memory 695 where it is stored in temporary register $T_2$.

Step 311 utilizes multi-cycle multiplier 610. Register memory 695 provides $T_1$ on both lines 635 and 640 to multi-cycle multiplier 610. Multi-cycle multiplier 610 computes $T_1^2$ and the result is output on line 650 to register memory 695 $Y_3$ where it is stored in $Y_3$.

Step 312 utilizes multi-cycle multiplier 610. Register memory 695 provides $T_2$ on both lines 635 and 640 to multi-cycle multiplier 610. Multi-cycle multiplier 610 computes $T_2^2$ and the result is output on line 650 to register memory 695 where it is stored in $X_3$.

Step 313 utilizes multi-cycle multiplier 610. Register memory 695 provides $T_1$ on line 635 and $Y_3$ on line 640 to multi-cycle multiplier 610. Multi-cycle multiplier 610 computes $T_1*Y_3$ and the result is output on line 650 to register memory 695 where it is stored in temporary register $T_1$.

Step 314 utilizes both multi-cycle multiplier 610 and SAU 400. Register memory 695 provides $X_3$ on line 665 to input "0" of MUX 620 with MUX 620 set to "0". MUX 620 sends $X_3$ to input A of SAU 400 on line 670. Line 670 is directly connected to the minuend input of subtractor 710. Register memory 695 provides $T_1$ on line 660 to input "0" of MUX 630 with MUX 630 set to "0". MUX 630 sends $T_1$ on line 675 to input B of SAU 400. Line 650 is directly connected to the subtrahend input of subtractor 710. Subtractor 710 computes and outputs A−B (which is $X_3-T_1$) on line 730 to the minuend input of subtractor 720. Register memory 695 provides $X_1$ on line 635 and $Y_3$ on line 640 to multi-cycle multiplier 610. Multi-cycle multiplier 610 computes $Y_3*X_1$. The result is output on line 650 to input C of SAU 400 which is directly connected to logical one bit left shifter 715 which multiplies input C by two and outputs 2C (which is $2Y_3*X_1$) on line 735 to the subtrahend output of subtractor 720. Subtractor 720 computes and outputs A−B−2C on line 750 to input "1" of MUX 740 with MUX 740 set to "1". MUX 740 sends D (which is $A-B-2C=X_3-T_1-2Y_3*X_1$) on line 690 to register memory 695 where it is stored in $X_3$.

Step 315 utilizes both multi-cycle multiplier 610 and SAU 400. In step 314, $Y_3*X_1$ was computed by multi-cycle multiplier 610. Hence, $Y_3*X_1$ is still present in the output register (not shown) of multi-cycle multiplier 610 and in Step 315 is sent on line 650 to input "1" of MUX 620 and MUX 620 is set to "1". MUX 620 sends $Y_3*X_1$ on line 670 to input A of SAU 400. Line 670 is connected directly to the minuend input of subtractor 710. Register memory 695 provides $X_3$ on line 660 to input "0" of MUX 630 with MUX 630 set to "0". MUX 630 sends $X_3$ on line 675 to input B of SAU 400. Line 675 is directly connected to the subtrahend input of subtractor 710. Subtractor 710 calculates A−B and sends the result on line 730 to input "0" of MUX 740 with MUX 740 set to "0". MUX 740 sends D (which is $A-B=Y_3*X_1-X_3$) on line 690 to register memory 695 which passes D through on line 635 and provides $T_2$ on line 640 to multi-cycle multiplier 610. Multi-cycle multiplier 610 computes $D*T_2$ (which is $(Y_3*X_1-X_3)*T_2$) and outputs the result on line 650 to register memory 695 where the result is stored in $Y_3$.

Step 316 utilizes both multi-cycle multiplier 610 and SAU 400. Register memory 695 provides $Y_3$ on line 665 to input "0" of MUX 620 with MUX 620 set to "0". MUX 620 sends $Y_3$ on line 670 to input A of SAU 400. Line 670 is directly connected to the minuend of subtractor 710. Register memory 695 provides $T_1$ on line 635 and $Y_1$ on line 640 to multi-cycle multiplier 610. Multi-cycle multiplier 610 computes and outputs $T_1*Y_1$ on line 650 to input "1" of MUX 630 with MUX 630 set to "1". MUX 630 sends $T_1*Y_1$ on line 675 to input B of SAU 400. Line 675 is directly connected to the subtrahend of subtractor 710. Subtractor 710 computes A−B (which is $Y_3-T_1*Y_1$) and provides the result on line 730 to input "0" of MUX 740 with MUX 740 set to "0". MUX 740 sends D (which is $Y_3-T_1*Y_1$) on line 690 to register memory 695 where the result is stored in $Y_3$.

Step 317 returns the result of the addition of P+Q in Jacobian coordinates which is $(X_3, Y_3, Z_3)$.

The invention claimed is:
1. A data cryptographic apparatus comprising:
computational logic configured to perform an elliptic curve cryptography (ECC) point addition operation using mixed affine-Jacobian coordinates over a short Weierstrauss curve of the form $y=x^3+ax+b$ where $a=-3$;
a register memory configured to store a first point in affine coordinates and a second point in Jacobian coordinates, wherein the register memory is configured for two temporary storage variables, $T_1$ and $T_2$;
a modular multiplier electrically coupled to the register memory, wherein the modular multiplier is configured to perform at most one modular multiplication for each step in a sequence of steps in the ECC point addition operation; and
a simple arithmetic processor configured to perform modular subtraction and modular multiplication by two in support of the ECC point addition operation utilizing two modular subtractors, a logical one bit left shifter to either output A−B−2C for an input of variables A, B, and C or A−B for an input of variables A and B, wherein the simple arithmetic processor is electrically coupled to the computational logic, the register memory, and the modular multiplier to output a result of the ECC point addition operation in the Jacobian coordinates.

2. A mobile device comprising the data cryptographic apparatus of claim 1.

3. A smartcard comprising the data cryptographic apparatus of claim 1.

4. The mobile device of claim 2, wherein the mobile device is a smartphone.

5. A method for performing an elliptic curve cryptography (ECC) point addition operation using mixed affine-Jacobian coordinates over a short Weierstrauss curve of the form $y=x^3+ax+b$ where $a=-3$ comprising:

accepting, with a computational device, as variable input a first point in affine coordinates and a second point in Jacobian coordinates using a simple arithmetic processor;

configuring the simple arithmetic processor for modular subtraction and modular multiplication by two utilizing two modular subtractors, a logical one bit left shifter to either output A−B−2C for an input of variables A, B, and C or A−B for an input of variables A and B;

enabling a modular multiplier of the computational device to execute a sequence of steps to perform the ECC point addition operation of the first point and the second point, wherein the modular multiplier performs at most one modular multiplication for each step in the sequence of steps, wherein the sequence of steps requires no more than two temporary variables; and outputting, by the computational device, a result of the ECC point addition operation in the Jacobian coordinates.

6. The method of claim 5, wherein the computational device is part of a mobile device.

7. The method of claim 6, wherein the mobile device is a smartphone.

8. The method of claim 5, wherein the computational device is part of a smartcard.

* * * * *